US011532828B2

(12) United States Patent
Ishikawa et al.

(10) Patent No.: US 11,532,828 B2
(45) Date of Patent: Dec. 20, 2022

(54) FUEL CELL SYSTEM (71) Applicant: TOYOTA JIDOSHA KABUSHIKI KAISHA, Toyota (JP)

(72) Inventors: Tomotaka Ishikawa, Nagoya (JP); Satoshi Watanabe, Okazaki (JP); Kazushi Akamatsu, Anjou (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/391,163

(22) Filed: Aug. 2, 2021

(65) Prior Publication Data
US 2022/0085394 A1 Mar. 17, 2022

(30) Foreign Application Priority Data

Sep. 11, 2020 (JP) .............................. JP2020-152810

(51) Int. Cl.
*H01M 8/04746* (2016.01)
*H01M 8/04858* (2016.01)
*H01M 8/04119* (2016.01)

(52) U.S. Cl.
CPC ..... *H01M 8/04753* (2013.01); *H01M 8/0494* (2013.01); *H01M 8/04119* (2013.01)

(58) Field of Classification Search
CPC ......... H01M 8/04119; H01M 8/04753; H01M 8/0494; H01M 8/24
See application file for complete search history.

(56) References Cited

U.S. PATENT DOCUMENTS 6,573,682 B1 * 6/2003 Pearson .................... H02J 7/34
320/101

FOREIGN PATENT DOCUMENTS

| JP | 2019-207802 | * | 12/2019 |
| JP | 2019207802 | A | 12/2019 |
| WO | WO 2020-174780 | * | 9/2020 |

OTHER PUBLICATIONS

English translation of WO Publication 2020-174780, Sep. 2020.*

* cited by examiner

Primary Examiner — Brittany L Raymond
(74) Attorney, Agent, or Firm — Dickinson Wright, PLLC (57) ABSTRACT A fuel cell system includes: a plurality of fuel cell units of which each includes a fuel cell, an air supply pipe, an air supply device, an air discharge pipe, and a control unit; and an exhaust pipe connected to the plurality of air discharge pipes and configured to discharge exhaust gas to the outside of the fuel cell system. The control units of the plurality of fuel cell units are configured such that, when one or more fuel cell units included in the plurality of fuel cell units are operating to generate electric power and each of the remainder of the plurality of fuel cell units is not operating to generate electric power, the control unit of the fuel cell unit that is not operating to generate electric power activates the air supply device of the corresponding fuel cell unit.

6 Claims, 6 Drawing Sheets

FIG. 5

FUEL CELL SYSTEM

CROSS-REFERENCE TO RELATED APPLICATION

This application claims priority to Japanese Patent Application No. 2020-152810 filed on Sep. 11, 2020, incorporated herein by reference in its entirety.

BACKGROUND

1. Technical Field

The present disclosure relates to a fuel cell system.

2. Description of Related Art

Japanese Unexamined Patent Application Publication No. 2019-207802 (JP 2019-207802 A) discloses a fuel cell system that includes a plurality of fuel cell stacks, a plurality of air supply devices serving to supply air by a reciprocating motion of a mechanical portion, and a plurality of supply pipes and discharges exhaust gas from the plurality of fuel cell stacks together. A control unit of the fuel cell system controls the mechanical portions of the air supply devices such that the superimposed amplitude of pressure waves which are generated due to the reciprocating motions of the mechanical portions of the air supply devices decreases.

SUMMARY

However, in the fuel cell system disclosed in Japanese Unexamined Patent Application Publication No. 2019-207802 (JP 2019-207802 A), problems which are caused when some of the plurality of fuel cell stacks and the plurality of air supply devices are operating and the others are not operating have not been satisfactorily studied. For example, since exhaust pipes of the fuel cell stacks are connected in parallel, there is a possibility that exhaust gas discharged from an operating fuel cell stack flows into the exhaust pipe of a non-operating fuel cell stack.

The present disclosure can be embodied in the following configurations.

According to an aspect of the present disclosure, there is provided a fuel cell system. The fuel cell system includes: a plurality of fuel cell units of which each includes a fuel cell, an air supply pipe connected to the fuel cell, an air supply device provided in the air supply pipe, an air discharge pipe configured to discharge exhaust gas including fuel exhaust gas and air exhaust gas from the fuel cell, and a control unit configured to control operation of the fuel cell; and an exhaust pipe that is connected to the plurality of air discharge pipes and configured to discharge the exhaust gas to the outside of the fuel cell system. The control units of the plurality of fuel cell units are configured such that, when one or more fuel cell units included in the plurality of fuel cell units are operating to generate electric power and each of the remainder of the plurality of fuel cell units is not operating to generate electric power, the control unit of the fuel cell unit that is not operating to generate electric power activates the air supply device of the corresponding fuel cell unit. According to this aspect, since the control unit of the fuel cell unit that is not operating to generate electric power activates the air supply device of the fuel cell unit to discharge air to the air discharge pipe of the fuel cell unit, it is possible to curb a backflow of exhaust gas of the fuel cell unit that is operating to generate electric power to the air discharge pipe of the fuel cell unit that is not operating to generate electric power.

In the fuel cell system according to the aspect, each of the plurality of fuel cell units may include: a bypass pipe that is configured to connect the air discharge pipe and the air supply pipe and configured to form a bypass passage that bypasses the fuel cell; and a bypass valve that is provided in the bypass pipe and configured to control a flow rate of air in the bypass pipe. The control unit of the fuel cell unit that is not operating to generate electric power may be configured to open the bypass valve. According to this aspect, air is not supplied to a fuel cell that is not operating to generate electric power.

In the fuel cell system according to the aspect, the control unit of the fuel cell unit that is not operating to generate electric power may be configured to cause the air supply device of the corresponding fuel cell unit to supply air at a minimum flow rate and to fully open the bypass valve of the corresponding fuel cell unit. According to this aspect, it is possible to decrease power consumption in the air supply device of the fuel cell unit that is not operating to generate electric power.

In the fuel cell system according to the aspect, the control unit of the fuel cell unit that is not operating to generate electric power may be configured to cause the air supply device of the corresponding fuel cell unit to start supply of air at a timing at which a predetermined time has elapsed after supply of air by the air supply device of the fuel cell unit that is operating to generate electric power has been started. Exhaust gas of the fuel cell unit that is operating to generate electric power does not flow back to the fuel cell unit that is not operating to generate electric power for a predetermined time. According to this aspect, it is possible to further decrease power consumption in the air supply device in comparison with a case in which supply of air in the fuel cell unit that is not operating to generate electric power is started at the same time as starting supply of air by the air supply device in the fuel cell unit that is operating to generate electric power.

In the fuel cell system according to the aspect, lengths of the air discharge pipes of the plurality of fuel cell units may be different, and the control unit of the fuel cell unit that is not operating to generate electric power may be configured to cause the air supply device of the corresponding fuel cell unit to start supply of air with a time delay corresponding to a time until exhaust gas in the fuel cell unit that is operating to generate electric power reaches the air discharge pipe of the fuel cell unit that is not operating to generate electric power via the exhaust pipe. According to this aspect, it is possible to curb a backflow of exhaust gas due to a difference in power-generating operation timings between the power generation units. It is also possible to decrease power consumption in the air supply device.

The fuel cell system according to the aspect may further include: a housing configured to accommodate the plurality of fuel cell units therein; a ventilation device provided in the housing and configured to ventilate the inside of the housing; and a ventilation control unit configured to increase a ventilation rate of the ventilation device when each of one or more fuel cell units included in the plurality of fuel cell units is not able to be supplied with air by the air supply device in comparison with a case in which air is able to be supplied by all of the air supply devices. According to this aspect, even when exhaust gas including fuel exhaust gas flows backward, it is possible to discharge the exhaust gas including fuel exhaust gas in the housing to the outside of the housing using the ventilation device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
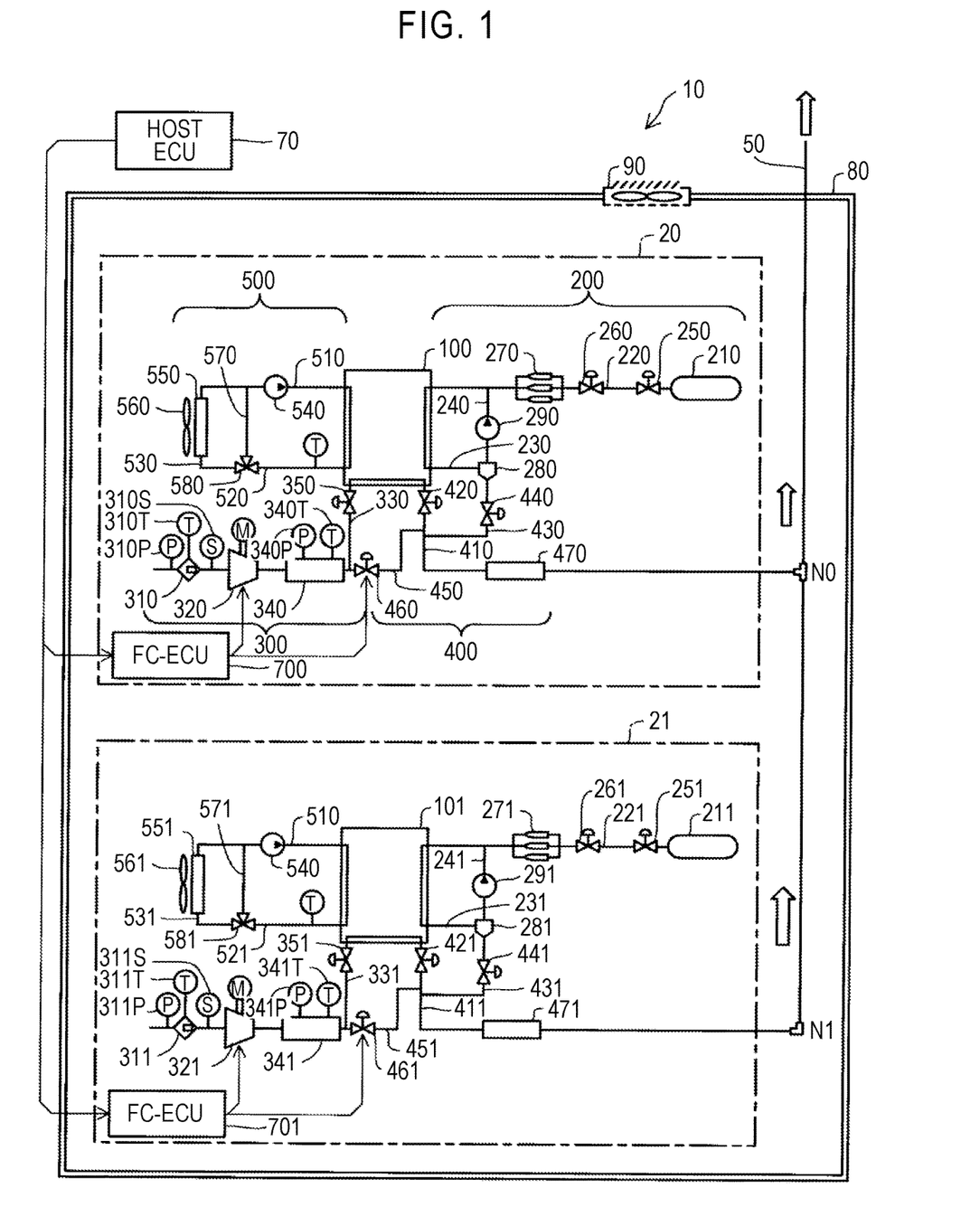
FIG. 1 is a diagram schematically illustrating a configuration of a fuel cell system.

FIG. 1 is a diagram schematically illustrating a configuration of a fuel cell system 10. The fuel cell system 10 includes a plurality of fuel cell units 20 and 21, an exhaust pipe 50, a host control unit 70 (a "host ECU 70" in FIG. 1), a housing 80, and a ventilation device 90. The plurality of fuel cell units 20 and 21 is accommodated in the housing 80. The housing 80 is an engine room in which the fuel cell units 20 and 21 are accommodated or an FC container that is a container in which the plurality of fuel cell units 20 and 21 is accommodated when the plurality of fuel cell units 20 and 21 is mounted in a mobile object, and may be a cabin or a room of a building when the plurality of fuel cell units 20 and 21 is stationary. The exhaust pipe 50 is a pipe that communicates with the outside of the housing 80 and discharges fuel exhaust gas and air exhaust gas from the fuel cell units 20 and 21 to the outside of the housing 80. The ventilation device 90 is a device that ventilates the inside of the housing 80. The host control unit 70 controls operations of the fuel cell units 20 and 21.

The fuel cell units 20 and 21 are units that generate electric power by causing fuel gas and oxidant gas to react with each other. Since the fuel cell units 20 and 21 have the same configuration, the fuel cell unit 20 will be described below in this specification and the fuel cell unit 21 will not be described. Reference numerals of the constituents of the fuel cell unit 21 are defined by adding 1 to reference numerals of the constituents of the fuel cell unit 20.

The fuel cell unit 20 includes a fuel cell 100, a fuel gas supply circuit 200, an air supply circuit 300, an exhaust gas circuit 400, a cooling circuit 500, and a control unit 700 (an "FC-ECU 700" in FIG. 1). The fuel gas supply circuit 200, the air supply circuit 300, and the exhaust gas circuit 400 are reactant gas circuits.

The fuel cell 100 generates electric power using fuel gas and oxidant gas which are reactant gases. In this embodiment, hydrogen is used as the fuel gas and oxygen in air (also referred to as "air") is used as the oxidant gas.

The fuel gas supply circuit 200 includes a fuel gas tank 210, a fuel gas supply pipe 220, a fuel gas exhaust pipe 230, a fuel gas recirculation pipe 240, a main stop valve 250, a regulator 260, an injector 270, a gas-liquid separator 280, and a hydrogen pump 290. The fuel gas tank 210 stores fuel gas. The fuel gas tank 210 and the fuel cell 100 are connected via the fuel gas supply pipe 220. In the fuel gas supply pipe 220, the main stop valve 250, the regulator 260, and the injector 270 are provided in that order from the fuel gas tank 210 side. The main stop valve 250 turns supply of fuel gas from the fuel gas tank 210 on or off. The regulator 260 adjusts a pressure of fuel gas that is supplied to the fuel cell 100. The injector 270 injects fuel gas to the fuel cell 100.

The fuel gas exhaust pipe 230 discharges fuel exhaust gas from the fuel cell 100. The fuel gas recirculation pipe 240 is connected to the fuel gas exhaust pipe 230 and the fuel gas supply pipe 220. The gas-liquid separator 280 is provided in a connecting portion between the fuel gas exhaust pipe 230 and the fuel gas recirculation pipe 240. The fuel exhaust gas includes unconsumed hydrogen, impurities such as nitrogen moving via the fuel cell 100, and water. The gas-liquid separator 280 separates water and gas (impurities such as hydrogen and nitrogen) in the fuel exhaust gas. The hydrogen pump 290 is provided in the fuel gas recirculation pipe 240. The hydrogen pump 290 supplies gas separated by the gas-liquid separator 280 to the fuel gas supply pipe 220. Accordingly, the fuel cell unit 20 uses unconsumed hydrogen included in the fuel exhaust gas as fuel. In this embodiment, the hydrogen pump 290 is used, but an ejector may be used instead.

The air supply circuit 300 includes an air cleaner 310, an air compressor 320, an air supply pipe 330, an intercooler 340, and an inlet valve 350. The air cleaner 310 removes dust in air at the time of intake of air. An atmospheric pressure sensor 310P that measures an atmospheric pressure is provided upstream from the air cleaner 310. An outside air temperature sensor 310T that acquires the temperature of air before intake into the air cleaner 310 is provided in the air cleaner 310. An air flowmeter 310S that measures an amount of air that is taken in is provided downstream from the air cleaner 310. The air compressor 320 compresses air and supplies air to the fuel cell 100 via the air supply pipe 330. The intercooler 340 cools air of which the temperature has increased due to compression in the air compressor 320. A supply gas temperature sensor 340T that measures a temperature of air supplied to the fuel cell 100 and a supply gas pressure sensor 340P that measures a pressure of air supplied to the fuel cell 100 are provided in the intercooler 340. The inlet valve 350 is provided at an entrance of the air supply pipe 330 into the fuel cell 100 and switches supply of air to the fuel cell 100 on/off.

The exhaust gas circuit 400 includes an air discharge pipe 410, a pressure control valve 420, a fuel gas discharge pipe 430, an exhaust/drain valve 440, a bypass pipe 450, a bypass valve 460, and a silencer 470. The air discharge pipe 410 discharges air exhaust gas of the fuel cell 100. The pressure control valve 420 is provided in the air discharge pipe 410. The pressure control valve 420 adjusts the pressure of air in the fuel cell 100. The fuel gas discharge pipe 430 connects the gas-liquid separator 280 and the air discharge pipe 410. The exhaust/drain valve 440 is provided in the fuel gas discharge pipe 430. When a nitrogen concentration in fuel exhaust gas is high or when an amount of water in the gas-liquid separator 280 is large, the control unit 700 opens the exhaust/drain valve 440 to discharge water and fuel exhaust gas collected in the gas-liquid separator 280 to the air discharge pipe 410. The discharged fuel exhaust gas includes impurities such as nitrogen and hydrogen. In this embodiment, the fuel gas discharge pipe 430 is connected to the air discharge pipe 410 and hydrogen in the discharge fuel exhaust gas is diluted with air exhaust gas. The bypass pipe 450 connects an upstream side of the air supply pipe 330 with respect to the inlet valve 350 and a downstream side of the air discharge pipe 410 with respect to the pressure control valve 420 to form a bypass passage bypassing the fuel cell 100. The bypass valve 460 is provided in the bypass pipe 450. When the exhaust/drain valve 440 is opened to discharge water and the fuel exhaust gas (impurities such as nitrogen and hydrogen), the control unit 700 opens the bypass valve 460 to allow air to flow to the air discharge pipe 410 and to dilute hydrogen. When electric power required for the fuel cell 100 is small, the control unit 700 opens the bypass valve 460 to decrease an amount of air supplied to the fuel cell 100. The silencer 470 is provided downstream in the air discharge pipe 410 and serves to decrease a volume of exhaust sound. Instead of the inlet valve 350 and the bypass valve 460, a three-way valve may be used in a connecting portion between the air supply pipe 330 and the bypass pipe 450.

The cooling circuit 500 includes a coolant supply pipe 510, a coolant discharge pipe 520, a radiator pipe 530, a coolant pump 540, a radiator 550, a bypass pipe 570, and a three-way valve 580. The coolant supply pipe 510 is a pipe for supplying a coolant to the fuel cell 100 and the coolant pump 540 is provided in the coolant supply pipe 510. The coolant pump 540 circulates a coolant in the cooling circuit 500 and supplies the coolant to the fuel cell 100. The coolant discharge pipe 520 is a pipe for discharging a coolant from the fuel cell 100. A downstream side of the coolant discharge pipe 520 is connected to the radiator pipe 530 and the bypass pipe 570 via the three-way valve 580. The radiator 550 is provided in the radiator pipe 530. A radiator fan 560 is provided in the radiator 550. The radiator fan 560 sends wind to the radiator 550 and urges heat to be radiated from the radiator 550. A downstream side of the radiator pipe 530 and a downstream side of the bypass pipe 570 are connected to the coolant supply pipe 510. A temperature sensor measures an outlet temperature Twout which is a temperature of the coolant discharged from the fuel cell 100.

The control unit 700 controls the fuel gas supply circuit 200, the air supply circuit 300, the exhaust gas circuit 400, and the cooling circuit 500.

The host control unit 70 controls the fuel cell units 20 and 21 by giving an instruction to the control units 700 and 701. The housing 80 is a vessel in which the fuel cell units 20 and 21 are accommodated, for example, a container. For example, when the fuel cell units 20 and 21 are accommodated in a building or a room of a building, the building or the room is an example of the housing 80. The exhaust pipe 50 is connected to the air discharge pipes 410 and 411 of the fuel cell units 20 and 21 at nodes N0 and N1, and a downstream side of the exhaust pipe 50 is connected to the atmosphere outside the housing 80. The exhaust pipe 50 discharges exhaust gas from the fuel cell units 20 and 21 to the atmosphere together. The ventilation device 90 ventilates the inside of the housing 80.

When both the fuel cell units 20 and 21 are operating to generate electric power, fuel exhaust gas and air exhaust gas (of which both are referred to as "exhaust gas" in the following description) discharged from the air discharge pipe 411 of the fuel cell unit 21 is discharged to the atmosphere outside of the housing 80 via the exhaust pipe 50. Similarly, since the fuel cell unit 20 is operating to generate electric power, exhaust gas discharged from the air discharge pipe 410 of the fuel cell unit 20 joins exhaust gas discharged from the air discharge pipe 411 of the fuel cell unit 21 at node N0 and is discharged to the atmosphere outside the housing 80 via the exhaust pipe 50.

On the other hand, when one of the fuel cell units 20 and 21 is operating to generate electric power and the other is not operating to generate electric power, there is a likelihood that exhaust gas discharged from the power generation unit that is operating to generate electric power will flow back to the power generation unit that is not operating to generate electric power. In this embodiment, in order to curb a backflow of exhaust gas, exhaust gas discharged from the air discharge pipe 411 of the fuel cell unit 21 is prevented from flowing back to the air discharge pipe 411 by activating the air compressor 320 in the fuel cell unit 20 that is not operating to generate electric power. This control will be described below.

Figure 2:
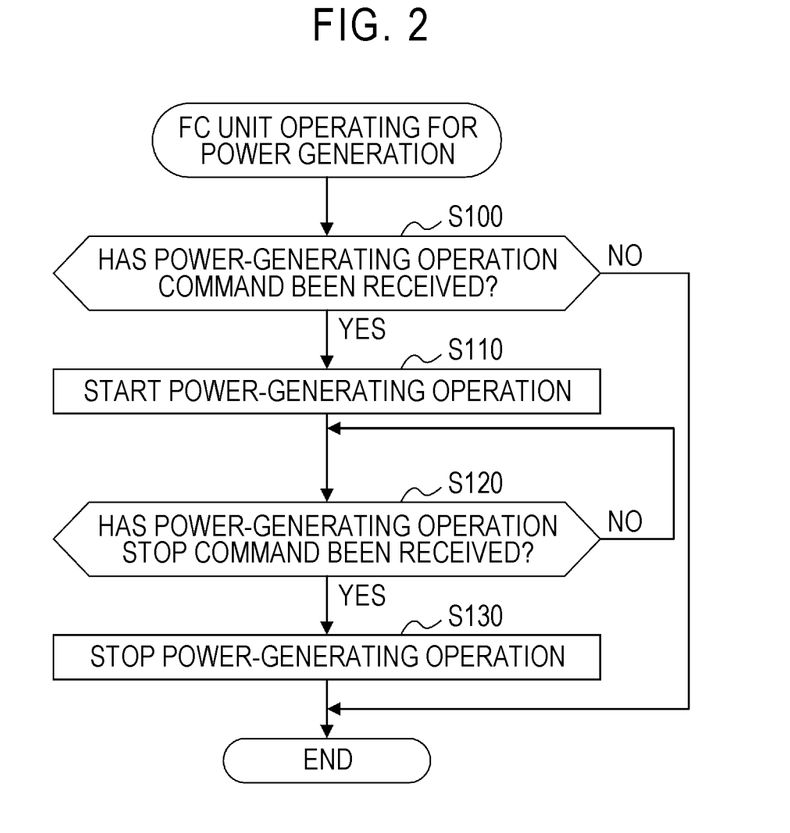
FIG. 2 is a flowchart illustrating a control routine which is performed by a control unit of a power generation unit that is operating to generate electric power.

A case in which only a power generation unit 21 starts a power-generating operation in a state in which none of two power generation units 20 and 21 are operating to generate electric power will be described below. FIG. 2 is a flowchart illustrating a control routine which is performed by the control unit 701 of the power generation unit 21 that is operating to generate electric power. In Step S100, when a power-generating operation command is received from the host control unit 70, the control unit 701 causes the routine to proceed to Step S110, supplies hydrogen which is fuel gas to the fuel cell 101, supplies air to the fuel cell 101 by driving the air compressor 321, and starts the power-generating operation of the power generation unit 21. Exhaust gas from the fuel cell 101 of the power generation unit 21 is discharged to the atmosphere outside the housing 80 from the air discharge pipe 411 via the exhaust pipe 50.

In Step S120, when a power-generating operation stop command is received from the host control unit 70, the control unit 701 causes the routine to proceed to Step S130, stops supply of hydrogen to the fuel cell 101, stops supply of air to the fuel cell 100 by stopping the air compressor 321, and stops the power-generating operation of the power generation unit 21.

Figure 3:
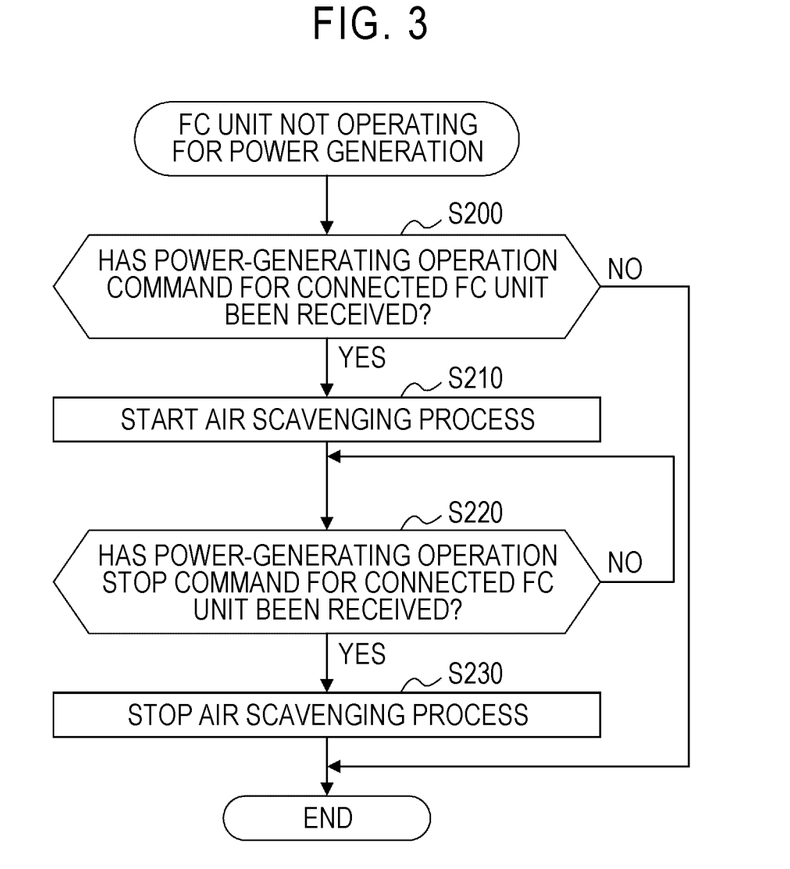
FIG. 3 is a flowchart illustrating a control routine which is performed by a control unit of a power generation unit that is not operating to generate electric power.

FIG. 3 is a flowchart illustrating a control routine which is performed by the control unit 700 of the power generation unit 20 that is not operating to generate electric power. In Step S200, when a notification indicating that a power-generating operation command is given to the control unit 701 of the other power generation unit 21 connected thereto is received from the host control unit 70, the control unit 700 causes the routine to proceed to Step S210, activates the air compressor 320, and starts an air scavenging process of opening the bypass valve 460. Air compressed by the air compressor 320 is discharged from node N0 to the exhaust pipe 50 via the bypass pipe 450, the air discharge pipe 410, and the silencer 470. Accordingly, exhaust gas from the fuel cell 101 of the power generation unit 21 does not flow back from the air discharge pipe 410 at node N0.

In Step S220, when a notification indicating that a power-generating operation stop command is given to the control unit 701 of the other power generation unit 21 is received from the host control unit 70, the control unit 700 causes the routine to proceed to Step S230, stops driving of the air compressor 320, closes the bypass valve 460, and stops the air scavenging process.

According to the aforementioned first embodiment, when one fuel cell unit 21 out of a plurality of fuel cell units 20 and 21 is operating to generate electric power, the control unit 700 of the other fuel cell unit 20 that is not operating to generate electric power causes the air compressor 320 which is an air supply device to supply air. As a result, exhaust gas from the fuel cell 101 of the power generation unit 21 that is operating to generate electric power does not flow back to the air discharge pipe 410 of the fuel cell unit 20 that is not operating to generate electric power at node N0. Thereafter, when the power-generating operation of the fuel cell unit 21 is also stopped, the control unit 700 of the fuel cell unit 20 performs Steps S220 and S230 in FIG. 3, and the control unit 701 of the fuel cell unit 21 performs Steps S120 and S130 in FIG. 2.

According to the first embodiment, the control unit 700 of the fuel cell unit 20 that is not operating to generate electric power can curb a backflow of exhaust gas by causing the air compressor 320 which is an air supply device to supply air and opening the bypass valve 460. At this time, air is not supplied to the fuel cell 100 and the fuel cell 100 is not caused to operate to generate electric power. Since the fuel cell 100 does not generate electric power when air is supplied to the fuel cell 100 and supply of electric power to the fuel cell 100 is not stopped, air exhaust gas may flow to the air discharge pipe 410 via the fuel cell 100 without passing through the bypass pipe 450.

In the first embodiment, since a pressure loss of the exhaust pipe 50 on the atmosphere side is low, exhaust gas from the fuel cell 101 of the power generation unit 21 does not flow back from the air discharge pipe 410 at node N0 when an amount of drive of the air compressor 320 is set to an amount of drive with which air of a minimum flow rate can be supplied and the bypass valve 460 is fully opened. In this case, it is possible to minimize power consumption in the air compressor 320. A minimum flow rate means a flow rate when the air compressor 320 is driven at a minimum rotation speed at which it does not operate intermittently. When the amount of drive of the air compressor 320 is set to be greater than an amount of drive with which air of the minimum flow rate can be supplied, it is possible to further curb a backflow of exhaust gas.

The case in which the power generation unit 21 starts the power-generating operation in a state in which none of two power generation units 20 and 21 are operating to generate electric power has been described above, but the same is true in a case in which the power-generating operation of the power generation unit 21 is held and the power-generating operation of the power generation unit 20 is stopped in a state in which both of the two power generation units 20 and 21 are operating to generate electric power. In this case, in the state in which the power-generating operation is being performed, the air compressors 320 and 321 of the power generation units 20 and 21 are driven at rotation speeds corresponding to amounts of generated electric power. When a power-generating operation stop command is received from the host control unit 70, the control unit 700 closes the inlet valve 350. Accordingly, the supply of air to the fuel cell 100 is stopped. Subsequently, the control unit 700 opens the bypass valve 460. Accordingly, air supplied from the air compressor 320 is discharged to the air discharge pipe 410 and the air scavenging process is performed. Accordingly, exhaust gas from the fuel cell 101 of the power generation unit 21 does not flow back from the air discharge pipe 410 at node N0.

In the aforementioned first embodiment, the number of power generation units is two, but the same is true when the number of power generation units is three or more. That is, when there are a power generation unit that is not operating to generate electric power and a power generation unit that is operating to generate electric power, it is possible to curb a backflow of exhaust gas by causing the air compressor, which is an air supply device in the power generation unit that is not operating to generate electric power, to supply air and opening the bypass valve, whereby air is not supplied to the fuel cell and the fuel cell does not operate to generate electric power.

Second Embodiment

Figure 4:
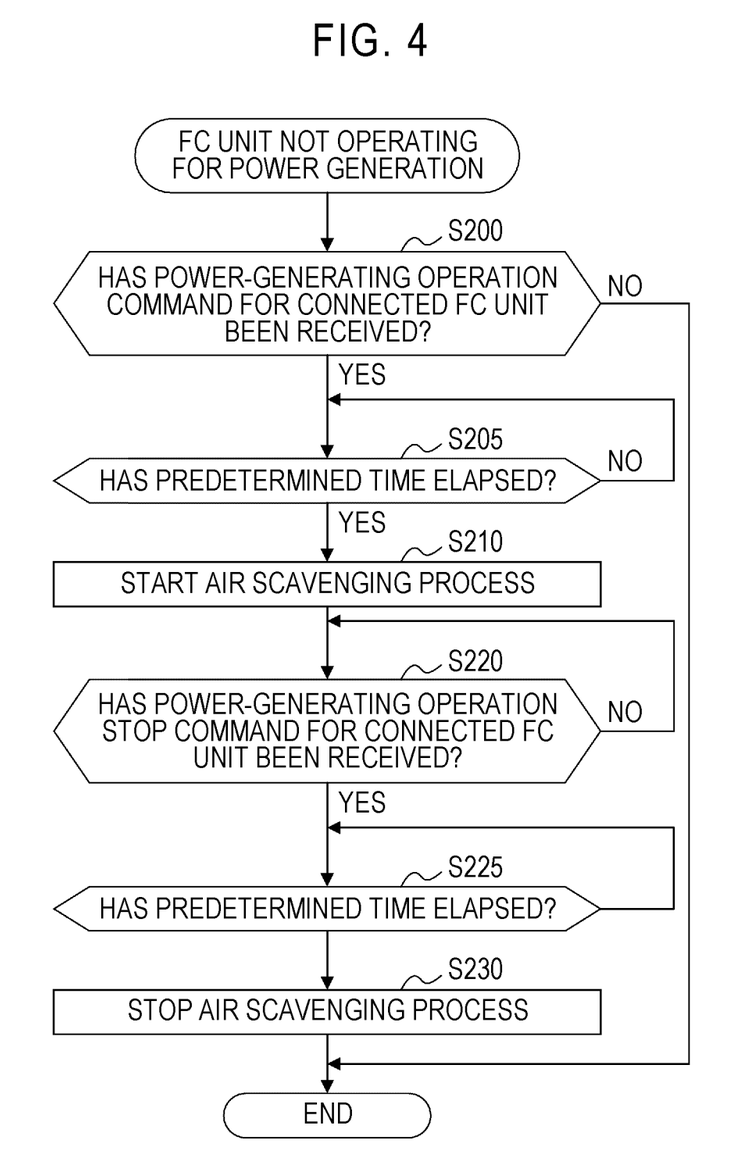
FIG. 4 is a flowchart illustrating a control routine which is performed by a control unit of a power generation unit that is not operating to generate electric power according to a second embodiment.

FIG. 4 is a flowchart illustrating a control routine which is performed by the control unit 700 of the fuel cell unit 20 that is not operating to generate electric power according to a second embodiment. The second embodiment is different from the first embodiment, in that the drive timing of the air compressor 320 in the fuel cell unit 20 that is not operating to generate electric power is delayed. That is, the control routine illustrated in FIG. 4 is different from the control routine illustrated in FIG. 3, in that Steps S205 and S225 are additionally provided.

In Step S200, when a notification indicating that a power-generating operation command is given to the control unit 701 of the other power generation unit 21 connected thereto is received from the host control unit 70, the control unit 700 causes the routine to proceed to Step S205, and causes the routine to proceed to Step S210 after a predetermined time elapses. The predetermined time in which the control unit 700 is on standby in Step S205 is a time until exhaust gas from the fuel cell unit 21 that is operating to generate electric power reaches node N0. For example, this time can be calculated by dividing a sum of a volume of the air discharge pipe 411 of the fuel cell unit 21 that is operating to generate electric power and a volume of the exhaust pipe 50 from node N1 to node N0 by an amount of air supplied per unit time of the air compressor 321.

In this embodiment, the fuel cell system 10 includes two power generation units 20 and 21, but a case in which the fuel cell system 10 includes three or more power generation units 20, 21, and 22 will be considered. Reference numerals of the constituents of the power generation unit 22 are defined by adding 2 to the reference numerals of the constituents of the power generation unit 20. The air discharge pipe 410 of the power generation unit 20 is connected to the exhaust pipe 50 at node N0 which is furthest downstream, the air discharge pipe 412 of the power generation unit 22 is connected to the exhaust pipe 50 at node N2 which is furthest upstream, and the air discharge pipe 411 of the power generation unit 21 is connected to the exhaust pipe 50 at node N1 which is located between node N0 and node N2. It is assumed that the power generation unit 21 is operating to generate electric power and the power generation units 20 and 22 are not operating to generate electric power. In this case, the control unit 700 of the power generation unit 20 that is not operating to generate electric power calculates the predetermined time as follows. In consideration of a worst case in which exhaust gas from the power generation unit 21 flows downstream, the control unit 700 of the power generation unit 20 calculates the predetermined time by dividing a sum of a volume of the air discharge pipe 411 of the power generation unit 21 and a volume of the exhaust pipe 50 from node N1 to node N0 by an amount of air supplied per unit time of the air compressor 321. The same is true of the control unit 702 of the power generation unit 22 that is not operating to generate electric power. That is, in consideration of a worst case in which exhaust gas from the power generation unit 21 flows upstream, the control unit 702 of the power generation unit 22 calculates the predetermined time by dividing a sum of a volume of the air discharge pipe 411 of the fuel cell unit 21 and a volume of the exhaust pipe 50 from node N1 to node N2 by an amount of air supplied per unit time of the air compressor 321. By considering the worst case in this way, it is possible to reliably prevent exhaust gas in another power generation unit that is operating to generate electric power from flowing back to the air discharge pipe.

In Step S220, when a notification indicating that a power-generating operation stop command is given to the control unit 701 of another power generation unit 21 connected thereto is received from the host control unit 70, the control unit 700 causes the routine to proceed to Step S225, causes the routine to proceed to Step S230 after the predetermined time elapses, and stops driving of the air compressor 320. The predetermined time in which the control unit 700 is on standby in Step S225 is a time until exhaust gas including hydrogen exceeds node N0 in a state in which the exhaust gas of the fuel cell unit 21 that is operating to generate electric power includes only air. This time can be calculated in the same way as the time in Step S205. The predetermined time in which the control unit 702 of the power generation unit 22 that is not operating to generate electric power is on standby in Step S225 can be calculated in the same way.

As described above, exhaust gas from the fuel cell unit 21 that is operating to generate electric power does not flow back immediately to the fuel cell unit 20 that is not operating to generate electric power. According to the second embodiment, since the control unit 700 of the fuel cell unit 20 that is not operating to generate electric power starts supply of air by the air supply device 320 of the fuel cell unit that is not operating to generate electric power after supply of air by the air supply device 321 of the fuel cell unit 21 that is operating to generate electric power has been started and a power-generating operation has been started, it is possible to decrease power consumption in the air supply device 320 in comparison with a case in which supply of air by the air supply device 320 is started at the same time as supplying air by the air supply device 321.

According to the aforementioned second embodiment, when the lengths of the air discharge pipes 410 and 411 are different, the control unit of a fuel cell unit that is not operating to generate electric power starts and stops the air compressor with a time delay corresponding to the time until exhaust gas in a fuel cell unit that is operating to generate electric power reaches its own air discharge pipe via the exhaust pipe 50, and thus it is possible to curb a backflow of exhaust gas due to a difference in power-generating operation timing between the power generation units. The control unit of the fuel cell unit that is not operating to generate electric power may stop the air compressor of the fuel cell unit that is not operating to generate electric power at the same time as stopping the power-generating operation.

Third Embodiment

Figure 5:
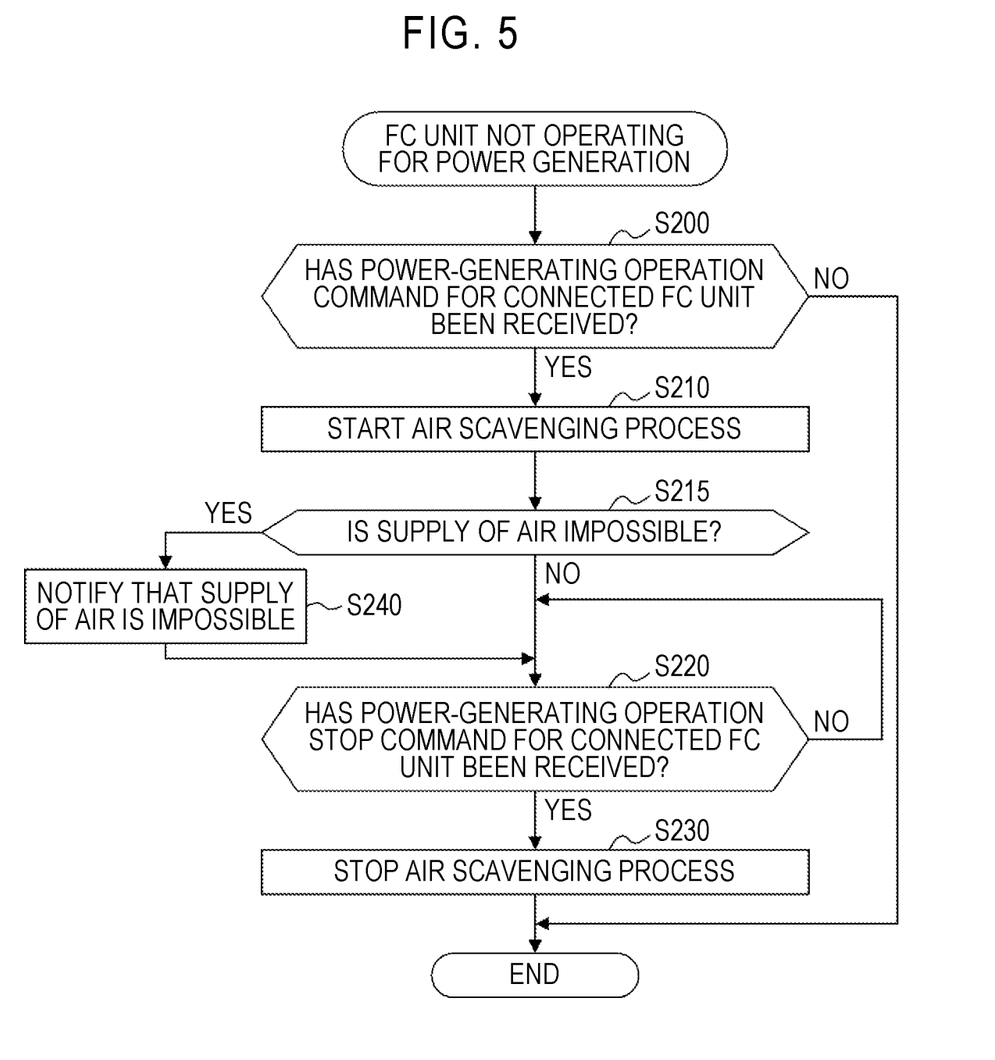
FIG. 5 is a flowchart illustrating a control routine which is performed by a control unit of a power generation unit that is not operating to generate electric power according to a third embodiment.

FIG. 5 is a flowchart illustrating a control routine which is performed by the control unit 700 of the fuel cell unit 20 that is not operating to generate electric power according to a third embodiment. The third embodiment is different from the first and second embodiments in which a backflow of exhaust gas is curbed, in that exhaust gas in the housing 80 is discharged when exhaust gas flows back for certain reasons. The control routine according to the third embodiment illustrated in FIG. 5 is different from the control routine according to the first embodiment, in that Steps S215 and S240 are additionally provided. This difference will be described below.

In Step S215, the control unit 700 of the fuel cell unit 20 that is not operating to generate electric power determines whether supply of air from the air compressor 320 is not possible, causes the routine to proceed to Step S240 when the supply of air is not possible, and causes the routine to proceed to Step S220 when the supply of air is possible. When a rotation speed sensor such as a resolver of the air compressor is provided in a drive motor of the air compressor 320, the control unit 700 determines whether the air compressor 320 is operating using the rotation speed from the rotation speed sensor. When the air compressor 320 is not operating, the control unit 700 determines that the supply of air from the air compressor 320 is not possible. The control unit 700 may compare an atmospheric pressure Pa measured by the atmospheric pressure sensor 310P and a pressure Pb of air measured by the supply gas pressure sensor 340P and determine that the supply of air from the air compressor 320 is not possible when Pa≈Pb is satisfied.

In Step S240, the control unit 700 notifies the host control unit 70 that the supply of air from the air compressor 320 is not possible.

Figure 6:
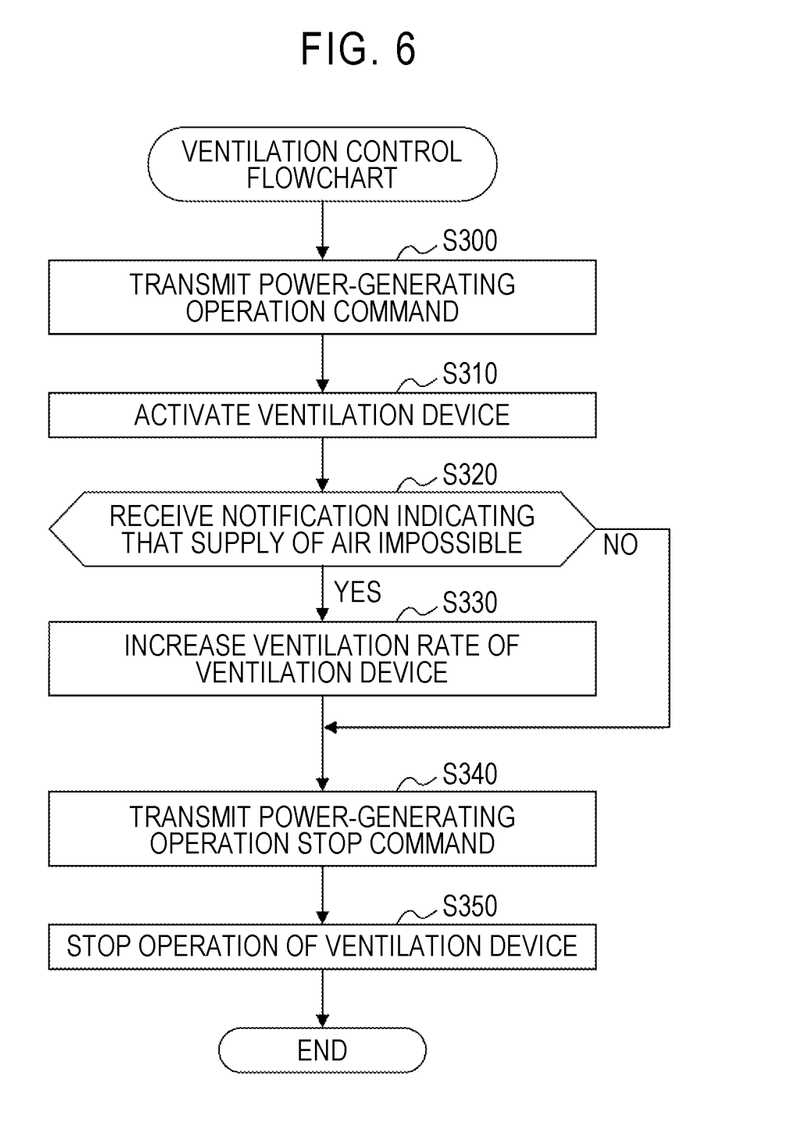
FIG. 6 is a flowchart illustrating a control routine which is performed by a host control unit according to the third embodiment.

FIG. 6 is a flowchart illustrating a control routine which is performed by the host control unit 70 according to the third embodiment. In Step S300, for example, a power-generating operation command is given to the control unit 701 of the power generation unit 21. When this command is received, the control unit 701 starts a power-generating operation of the power generation unit 21 as illustrated in Step S110 in FIG. 2. In Step S310 in FIG. 6, the host control unit 70 serves as a ventilation control unit and performs ventilation using the ventilation device 90.

In Step S320, when a notification indicating that the supply of air from the air compressor 320 is not possible is received from the control unit 700 of the power generation unit 20, the host control unit 70 causes the routine to proceed to Step S330 and increases a ventilation rate by the ventilation device 90. Accordingly, it is possible to discharge exhaust gas flowing back to the housing 80 to the outside of the housing 80. When the host control unit 70 gives a power-generating operation stop command to the control unit 701 of the fuel cell unit 21 that is operating to generate electric power in Step S340, the control unit 701 of the power generation unit 21 stops the power-generating operation of the power generation unit 21 as illustrated in Step S130 in FIG. 2. Thereafter, after the state in which the ventilation rate by the ventilation device 90 is increased is held for a predetermined time, ventilation by the ventilation device 90 is stopped. In this embodiment, the host control unit 70 performs ventilation using the ventilation device 90 when the power generation unit 21 is operating to generate electric power, but may perform ventilation of a predetermined ventilation rate using the ventilation device 90, that is, perform normal ventilation, even when the power generation unit 21 is not operating to generate electric power and increase the ventilation rate by the ventilation device 90 when supply of air from the air compressor 320 is not possible. In this embodiment, the state in which the ventilation rate by the ventilation device 90 has been increased is held for a predetermined time after the power-generating operation of the power generation unit 21 has been stopped, but the ventilation rate may be decreased to a normal state or the ventilation may be stopped at the same time as stopping the power-generating operation of the power generation unit 21.

According to the aforementioned third embodiment, since the ventilation rate by the ventilation device 90 is increased when air cannot be supplied from the air compressor of one of the fuel cell units more than when air can be supplied from all of the air compressors, it is possible to discharge air exhaust gas in the housing 80. When all the power generation units are operating to generate electric power or when air can be supplied from the air compressor, the ventilation rate by the ventilation device 90 is not increased and thus it is possible to curb an increase in power consumption of the ventilation device 90.

In the aforementioned embodiments, the control unit 700 of the fuel cell unit 20 receives a notification indicating whether the fuel cell unit 21 stops the power-generation operation from the host control unit 70, but may receive a notification indicating whether the fuel cell unit 21 has stopped the power-generating operation by communicating with the control unit 701 of the fuel cell unit 21. A configuration in which the control unit of one of a plurality of power generation units has the function of the host control unit 70 may be employed. A configuration in which each fuel cell unit does not include a control unit and the host control unit 70 has the functions of the control units of the fuel cell units may be employed.

In the aforementioned embodiments, the control unit 700 of the power generation unit 20 that is not operating to generate electric power drives the air compressor 320 and opens the bypass valve 460. The control unit 700 may stop driving of the air compressor 320, close the bypass valve 460, and close at least one of the inlet valve 350 and the pressure control valve 420. Exhaust gas flowing back in the air discharge pipe 410 is stopped by the bypass valve 460 and the inlet valve 350 or the pressure control valve 420. At this time, valves formed of rubber can be preferably used as the bypass valve 460, the inlet valve 350, and the pressure control valve 420.

The present disclosure is not limited the aforementioned embodiments and can be embodied in various forms without departing from the gist thereof. For example, technical features corresponding to technical features in the aspects described in the SUMMARY can be appropriately replaced or combined to solve some or all of the aforementioned problems or to achieve some or all of the aforementioned advantages. The technical features can be appropriately deleted unless they are described to be essential in this specification.

What is claimed is:

1. A fuel cell system comprising:
   a plurality of fuel cell units of which each includes a fuel cell, an air supply pipe connected to the fuel cell, an air supply device provided in the air supply pipe, an air discharge pipe configured to discharge exhaust gas including fuel exhaust gas and air exhaust gas from the fuel cell, and a control unit configured to control operation of the fuel cell; and
   an exhaust pipe connected to the plurality of air discharge pipes and configured to discharge the exhaust gas to the outside of the fuel cell system,
   wherein the control units of the plurality of fuel cell units are configured such that, when one or more fuel cell units included in the plurality of fuel cell units are operating to generate electric power and each of the remainder of the plurality of fuel cell units is not operating to generate electric power, the one or more control units of the remainder of the fuel cell units that are not operating to generate electric power activate the one or more air supply devices of the corresponding fuel cell units.

2. The fuel cell system according to claim 1, wherein each of the plurality of fuel cell units includes:
   a bypass pipe configured to connect the air discharge pipe and the air supply pipe and configured to form a bypass passage that bypasses the fuel cell; and
   a bypass valve provided in the bypass pipe and configured to control a flow rate of air in the bypass pipe, and
   wherein the one or more control units of the remainder of the fuel cell units that are not operating to generate electric power are configured to open the corresponding one or more bypass valves.

3. The fuel cell system according to claim 2, wherein the one or more control units of the fuel cell units that are not operating to generate electric power are configured to cause the one or more air supply devices of the corresponding fuel cell units to supply air at a minimum flow rate and to fully open the bypass valves of the corresponding fuel cell units.

4. The fuel cell system according to claim 1, wherein the one or more control units of the fuel cell units that are not operating to generate electric power are configured to cause the air supply devices of the one or more corresponding fuel cell units to start supply of air at a timing at which a predetermined time has elapsed after supply of air by the one or more air supply devices of the fuel cell units that are operating to generate electric power have been started.

5. The fuel cell system according to claim 1, wherein lengths of the air discharge pipes of the plurality of fuel cell units are different, and
   wherein the one or more control units of the fuel cell units that are not operating to generate electric power are configured to cause the one or more air supply devices of the corresponding fuel cell units to start supply of air with a time delay corresponding to a time until exhaust gas in the one or more fuel cell units that are operating to generate electric power reaches the air discharge pipe of the one or more fuel cell units that are not operating to generate electric power via the exhaust pipe.

6. The fuel cell system according to claim 1, further comprising:
   a housing configured to accommodate the plurality of fuel cell units therein;
   a ventilation device provided in the housing and configured to ventilate the inside of the housing; and
   a ventilation control unit configured to increase a ventilation rate of the ventilation device when each of one or more fuel cell units included in the plurality of fuel cell units is not able to be supplied with air by the air supply device in comparison with a case in which air is able to be supplied by all of the air supply devices.

* * * * *